United States Patent
Rink

(10) Patent No.: US 10,317,526 B2
(45) Date of Patent: Jun. 11, 2019

(54) LOCALIZATION OF CHARGING COILS, WHICH IS INTEGRATED IN DISTANCE SENSORS

(71) Applicant: Continental Teves AG & Co. oHG, Frankfurt (DE)

(72) Inventor: Klaus Rink, Rodenbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/505,776

(22) PCT Filed: Sep. 3, 2015

(86) PCT No.: PCT/EP2015/070151
§ 371 (c)(1),
(2) Date: Feb. 22, 2017

(87) PCT Pub. No.: WO2016/045933
PCT Pub. Date: Mar. 31, 2016

(65) Prior Publication Data
US 2017/0276787 A1    Sep. 28, 2017

(30) Foreign Application Priority Data
Sep. 25, 2014  (DE) .......... 10 2014 219 384

(51) Int. Cl.
*G01S 13/93*  (2006.01)
*G01S 15/02*  (2006.01)
(Continued)

(52) U.S. Cl.
CPC .......... *G01S 13/93* (2013.01); *B60L 3/0007* (2013.01); *B60L 50/50* (2019.02); *B60L 53/14* (2019.02);
(Continued)

(58) Field of Classification Search
None
See application file for complete search history.

(56) References Cited

U.S. PATENT DOCUMENTS 8,717,431 B2  5/2014  Lung
8,816,637 B2  8/2014  Martin et al.
(Continued)

FOREIGN PATENT DOCUMENTS

CN  1317698 A   10/2001
DE  19809416 A1  9/1999
(Continued)

OTHER PUBLICATIONS

International Preliminary Report on Patentability and Written Opinion for International Application No. PCT/EP2015/070151, dated Mar. 28, 2017, including English translation, 21 pages.
(Continued)

*Primary Examiner* — Chico A Foxx
(74) *Attorney, Agent, or Firm* — RatnerPrestia

(57) ABSTRACT

A sensor for outputting a first measurement signal that is dependent on a measurement variable to be detected in a vehicle, including: a sensor circuit having a measuring sensor for generating the first measurement signal on the basis of the measurement variable, and a magnetic field probe for outputting a second measurement signal that is dependent on a magnetic field to be detected.

14 Claims, 4 Drawing Sheets

(51) Int. Cl.
*G01S 13/88* (2006.01)
*G01S 15/93* (2006.01)
*G01S 13/86* (2006.01)
*B60L 11/18* (2006.01)
*B60L 3/00* (2019.01)
*B60L 50/50* (2019.01)
*B60L 53/14* (2019.01)
*B60L 53/16* (2019.01)
*B60L 53/36* (2019.01)
*B60L 53/60* (2019.01)

(52) U.S. Cl.
CPC .............. *B60L 53/16* (2019.02); *B60L 53/36* (2019.02); *B60L 53/60* (2019.02); *G01S 13/86* (2013.01); *G01S 13/88* (2013.01); *G01S 13/931* (2013.01); *G01S 15/02* (2013.01); *G01S 15/93* (2013.01); *G01S 15/025* (2013.01); *G01S 15/931* (2013.01); *G01S 2013/9314* (2013.01); *G01S 2013/9353* (2013.01); *G01S 2013/9364* (2013.01); *G01S 2013/9375* (2013.01); *G01S 2013/9378* (2013.01); *G01S 2013/9389* (2013.01); *G01S 2015/932* (2013.01); *G01S 2015/938* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| 8,820,160 | B2 | 9/2014 | Doering et al. | |
|---|---|---|---|---|
| 2001/0030537 | A1 | 10/2001 | Honkura et al. | |
| 2002/0155738 | A1* | 10/2002 | Ohsawa | B60Q 1/0088 439/98 |
| 2009/0127464 | A1* | 5/2009 | Laluvein | G08B 17/12 250/339.15 |
| 2011/0293138 | A1* | 12/2011 | Lung | B60R 21/013 382/103 |
| 2014/0060582 | A1* | 3/2014 | Hartranft | B60R 11/04 134/18 |
| 2014/0132207 | A1* | 5/2014 | Fisher | H02J 7/0052 320/108 |
| 2014/0132208 | A1 | 5/2014 | Fisher | |
| 2014/0247349 | A1* | 9/2014 | Heard | H04N 7/18 348/148 |
| 2015/0061897 | A1* | 3/2015 | Kees | B60L 11/1846 340/932.2 |
| 2015/0151641 | A1 | 6/2015 | Berger et al. | |
| 2015/0336464 | A1* | 11/2015 | Bell | B60L 11/182 320/108 |
| 2016/0001330 | A1* | 1/2016 | Romack | B08B 3/02 134/18 |

FOREIGN PATENT DOCUMENTS

| DE | 102007033654 A1 | 4/2008 |
|---|---|---|
| DE | 102010063665 A1 | 6/2012 |
| DE | 102011006504 A1 | 10/2012 |
| DE | 102012217258 A1 | 4/2013 |
| TW | 201141729 A | 12/2011 |
| WO | 2010037810 A1 | 4/2010 |
| WO | 2010040962 A1 | 4/2010 |
| WO | 2014023595 A2 | 2/2014 |

OTHER PUBLICATIONS

International Search Report and Written Opinion for International Application No. PCT/EP2015/070151, dated Jan. 12, 2016, 10 pages.
"New Sensor from Continental increases pedestrians' chances of survival in an accident," Oct. 5, 2010, pp. 1-2, Continental Corporation, Retrieved from the Internet: http://www.continental-corporation.com/www/pressportal_com_en/themes/press_releases/3_automotive_group/chassis_safety/press_releases/pr_2010_1 2010.
Chinese Office Action with Search Report for Chinese Application No. 201580048342.3, dated Dec. 29, 2018, 8 pages.
German Examination Report for German Application No. 10 2015 216 899.9, dated Oct. 17, 2018—8 pages.

* cited by examiner

LOCALIZATION OF CHARGING COILS, WHICH IS INTEGRATED IN DISTANCE SENSORS

CROSS REFERENCE TO RELATED APPLICATIONS

This application is the U.S. National Phase Application of PCT International Application No. PCT/EP2015/070151 filed Sep. 3, 2015, which claims priority to German Patent Application No. 10 2014 219 384.2, filed Sep. 25, 2014, the contents of such applications being incorporated by reference herein.

FIELD OF THE INVENTION

The invention relates to a distance sensor.

BACKGROUND OF THE INVENTION

An electronic device in the form of a sensor for outputting an electric signal is known from WO 2010/037810A1, which is incorporated by reference which is dependent on a physical variable which is detected by means of a physical field on the basis of a measuring sensor.

The printed publication WO 2014/023595, which is incorporated by reference discloses a vehicle having multiple receivers which are able to detect a magnetic field vector. In order to generate the magnetic field vectors, suitable antennas and/or transmitters are arranged on the primary coil of the charging unit, which generates a defined electromagnetic field. In this way, a precise positioning of the vehicle relative to the primary coil of the charging unit can be ascertained.

SUMMARY OF THE INVENTION

Starting from this, an aspect of the invention is to improve the known sensor.

According to one aspect of the invention, a sensor for outputting a first measurement signal that is dependent on a measurement variable to be detected in a vehicle comprises:
- a sensor circuit having a measuring sensor for generating the first measurement signal on the basis of the measurement variable, and
- a magnetic field probe for outputting a second measurement signal that is dependent on a magnetic field to be detected.

The indicated sensor is based on the consideration that electric vehicles could be charged with electric energy by means of transmission coils, which induce a charging voltage with a magnetic field in a receiving coil on the vehicle, with which charging voltage an electric energy storage device in the electric vehicle can in turn be charged up. To this end, the vehicle and in particular the receiving coil on the vehicle must be positioned exactly over the transmission coil, in order to achieve maximum efficiency during the inductive transfer of the electric energy.

In order to position the vehicle exactly, localized magnetic field probes distributed across the vehicle, which detect the extent of the magnetic field of the transmission coil at the individual locations in the vehicle, can be used. On the basis of these extents of the magnetic field, the relative position of the transmission coil and that of the receiving coil with respect to one another can be determined, for example by means of triangulation, and the position of the vehicle can be regulated in a suitable manner by moving it such that the receiving coil is positioned exactly over the transmission coil.

However, at least three magnetic field probes are required for a triangulation, in order to be able to determine the relative position between the transmission coil and the receiving coil in a meaningful manner, which is in turn associated with the installation space which is accordingly required.

If the magnetic field of the transmission coil can also be detected directionally, two magnetic field probes could also suffice in order to localize the transmission coil relative to the vehicle.

In this case, the use of the indicated sensor is based on the concept of integrating the magnetic field probe into an already existing sensor. In this way, a structure which already exists, such as a sensor circuit, signal processing circuit, data interface and a housing, can also be used, resulting in the amount of space required in the vehicle being considerably reduced.

Any sensor which already exists in the vehicle can essentially be selected as an already existing sensor. However, already existing sensors should preferably be selected, which are already present a number of times in the vehicle in terms of their structure, because they have to detect the same measuring variable at various sensor locations in the vehicle, for example. For instance, distance sensors but also wheel speed sensors can be such already existing sensors.

In a further development of the indicated sensor, the measuring sensor of the sensor circuit is set up to detect a distance from an obstacle which is located at a distance from the vehicle as a measurement variable. Already existing sensors in the vehicle having such measuring sensors are called distance sensors and have the advantage, compared with wheel speed sensors, that they can be effectively operated without a shielding plate. The disadvantage of the shielding plate, within the framework of the indicated sensor, is that it also shields the magnetic field of the transmission coil, thus making it unnecessarily difficult at the very least to determine the relative position between the transmission coil and the receiving coil.

According to another aspect of the invention, a method for positioning a vehicle, in which at least two, preferably at least three, of the indicated sensors are arranged at sensor locations which are located at a distance from one another, over a transmission coil in order to induce a charging voltage in a receiving coil of the vehicle in order to charge an electric energy storage device with a magnetic field, comprises the steps:
- detecting an extent of the magnetic field for each sensor location with the respective sensor arranged at the sensor location,
- determining a relative position of the transmission coil with respect to the vehicle on the basis of the detected extents of the magnetic field at the sensor locations, and
- moving the vehicle on the basis of the determined relative position until the vehicle is positioned with the transmission coil over the receiving coil.

The vehicle can be aligned exactly over the transmission coil by using the indicated method, so that the energy storage device of the vehicle can be charged very efficiently.

In a particular further development of the indicated method, the relative position of the transmission coil with respect to the vehicle is determined on the basis of a triangulation of the detected extents of the magnetic field at the sensor locations.

In another further development of the indicated method, in order to move the vehicle over the transmission coil, the vehicle is moved on a path which is determined on the basis of the relative position, wherein the vehicle is monitored during the movement on this path with the first measurement signal from the sensor circuit with respect to a collision with obstacles in the surroundings. In this way, both measuring sensors of the aforementioned sensor can be meaningfully used during the implementation of the indicated method.

In another further development, the indicated method comprises the step of positioning the vehicle in an area around the transmission coil until the magnetic field can be detected with the sensors on the basis of a global navigation satellite system which is called a GNSS. In this way, the vehicle can first be roughly positioned in the vicinity of the transmission coil, wherein the indicated method for precisely positioning the vehicle over the transmission coil by means of a handshake is used. The GNSS can, in this case, be used directly, but also as part of a fusion sensor.

According to another aspect of the invention, the object is achieved by means of a pressure sensor device for ascertaining an impact of a person with a vehicle, having
   foam padding which is arranged in a bumper of a vehicle and which lies in contact with an internal wall of the bumper,
   a pressure sensor for ascertaining a pressure acting from externally on the foam padding,
   wherein the pressure sensor device has a magnetic field probe for outputting a measurement signal that is dependent on a magnetic field to be detected.

Advantageously, the pressure sensor device is further developed in that the magnetic probe is configured such that it is integrated in the pressure sensor.

According to another aspect of the invention, a control device is set up to carry out one of the indicated methods.

In a further development of the indicated control device, the indicated device has a storage unit and a processor. The indicated method is thereby stored in the storage device in the form of a computer program, and the processor is provided to execute the method when the computer program is loaded from the storage device into the processor.

According to another aspect of the invention, a computer program comprises program code means, in order to perform all the steps of one of the indicated methods when the computer program is run on a computer or one of the indicated devices.

According to another aspect of the invention, a computer program product contains a program code which is stored on a computer-readable disk and which, when it is run on a data processing device, carries out one of the indicated methods.

According to another aspect of the invention, a vehicle comprises:
   a chassis supported on wheels,
   at least three of the indicated sensors, whether these are distance sensors or pressure sensors, which are arranged at sensor locations which are located at a distance from one another, and
   one of the indicated control devices for positioning the vehicle.

BRIEF DESCRIPTION OF THE DRAWINGS

The characteristics, features and advantages of this invention described above, as well as the way in which these are achieved, will become clearer and more readily comprehensible in connection with the following description of the embodiment examples which are explained in more detail in connection with the drawings, wherein.

DETAILED DESCRIPTION OF THE PREFERRED EMBODIMENTS

Figure 1:
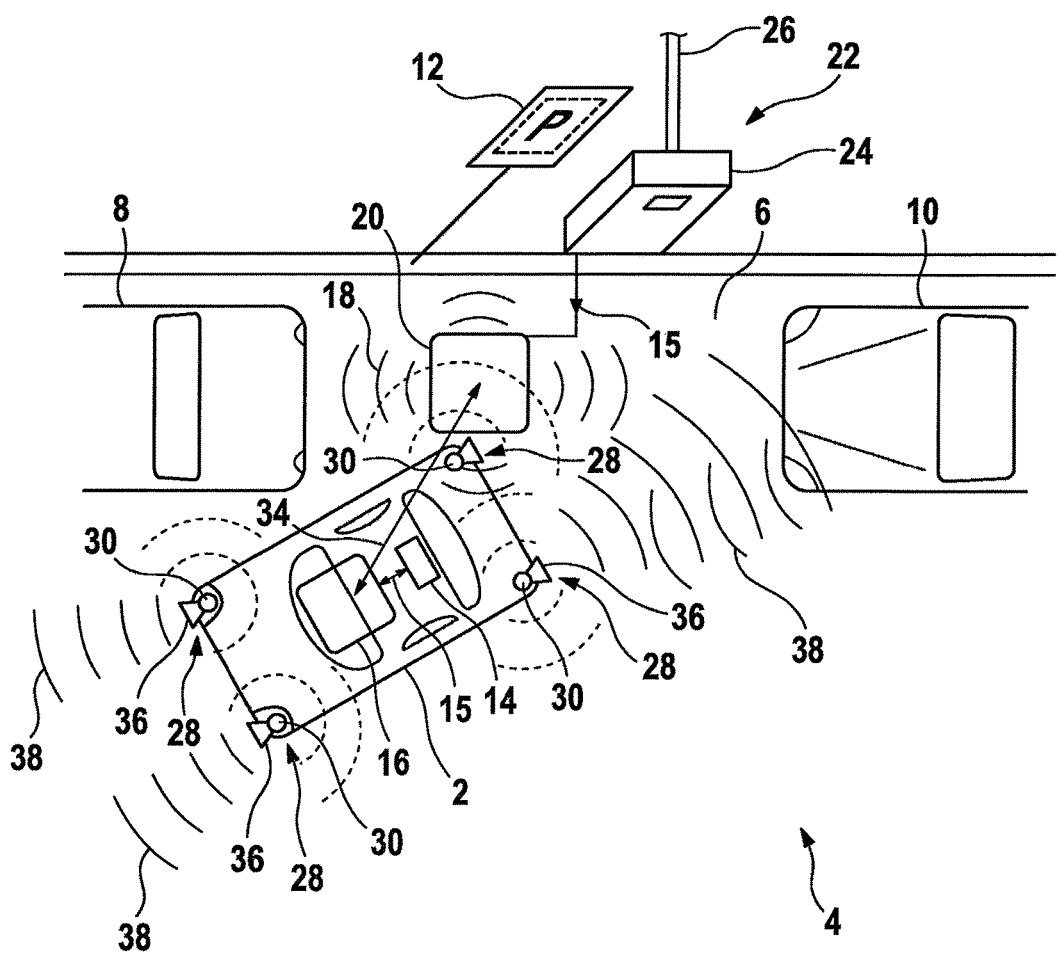
FIG. 1 shows a schematic diagram of a vehicle parking in a parking space having a transmission coil.

Identical technical elements in the figures are provided with the same reference numerals and are only described once.

Reference is made to FIG. 1 which shows a schematic diagram of a vehicle 2 intending to park in a parking space 6 between two other vehicles 8, 10 on a road 4. In this case, the parking possibility is indicated by a suitable traffic sign 12.

The vehicle 2 is designed hereinafter as an electric vehicle and will therefore also be referred to as such. In this case, the electrical vehicle 2 is supplied by means of an electric energy storage device 14 in a way which still has to be described in order, amongst other things, to be driven with electric energy 15. In addition, a receiving coil 16 is provided on the electrical vehicle 2, by means of which the electrical vehicle 2 can receive a magnetic field 18 in order to charge the electric energy storage device 14 and transform it into electric energy 15 by induction.

The magnetic field 18 is emitted within the framework of the present design by a transmission coil 20 which is provided as part of a charging station 22 in the parking space 6. The charging station 22 additionally comprises a control terminal 24 at which a user can make inputs in order, for example, to pay for the electric energy supply. The control terminal 24 thereby applies the electric energy 15, with which the electric energy storage device 14 is to be charged, to the transmission coil 20 which then excites the magnetic field 18 in the known way and thus transfers the electric energy by induction via the receiving coil 16 to the electric energy storage device 14 in the vehicle 2. In this case, the electric energy 15 can, for example, be extracted from an electric energy supply network 26 to which the control terminal 24 can be connected.

In order to transfer the electric energy 15 via the transmission coil 20 and the receiving coil 16 as efficiently as possible, the receiving coil 16 should be positioned as precisely as possible over the transmission coil 20.

Figure 3:
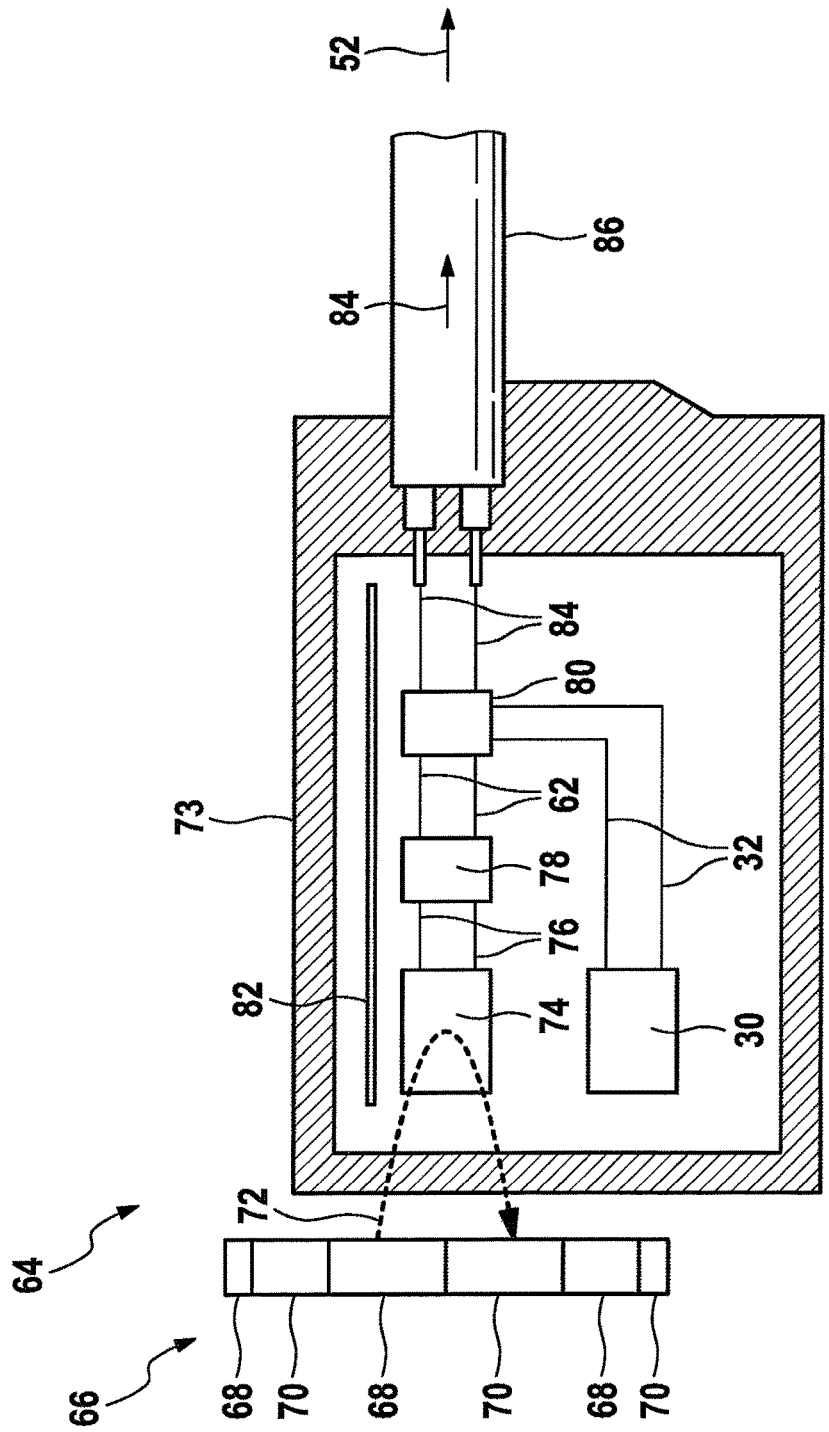
FIG. 3 shows a schematic diagram of a sensor in the vehicle from FIG. 2.
Figure 4:
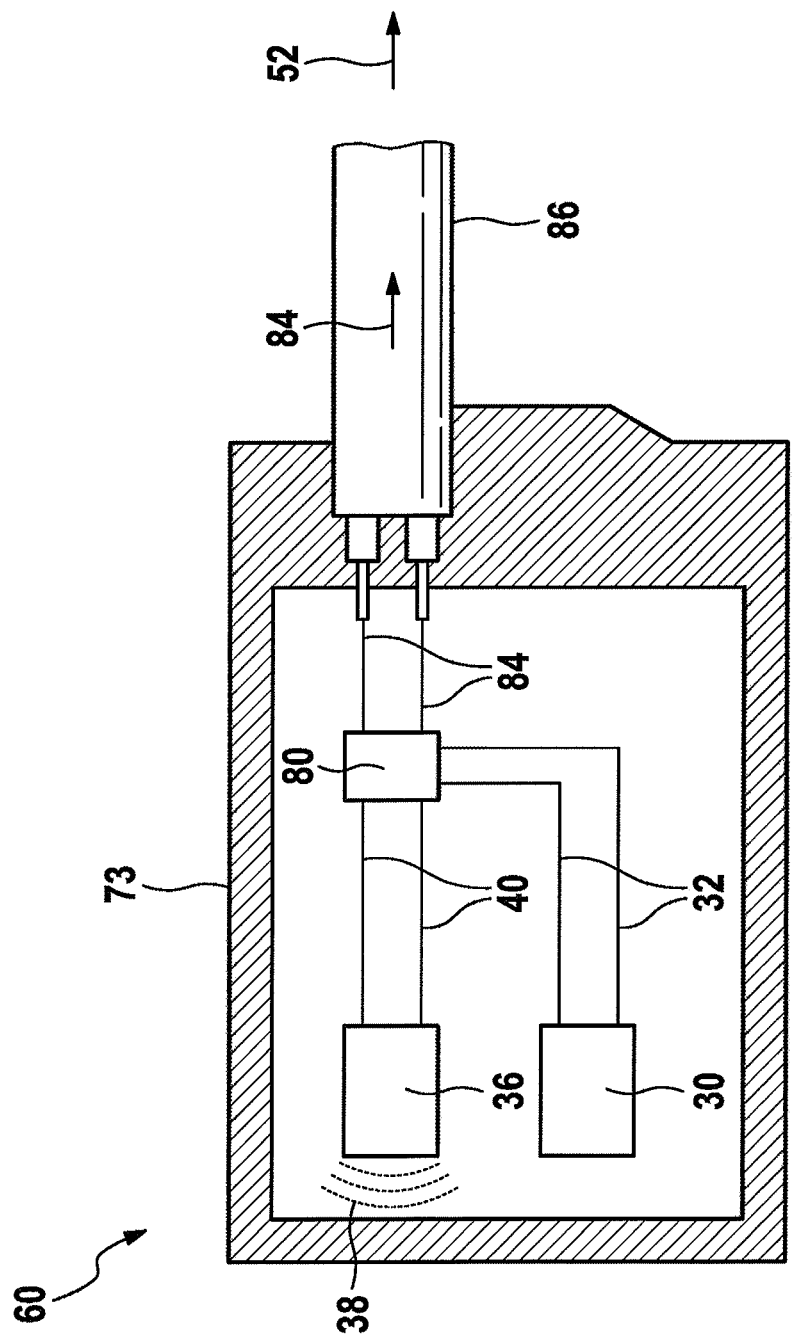
FIG. 4 shows a schematic diagram of a sensor in the vehicle from FIG. 2.

To this end, magnetic field probes 30 are provided on the vehicle 2 within the framework of the present design at four different sensor locations 28 which are located at a distance from one another. The magnetic field probes 30 detect the magnetic field 18 of the transmission coil 20 and output a magnetic field measurement signal 32 which is indicated in FIGS. 3 and 4, the level of which magnetic field measurement signal is dependent on the extent of the magnetic field 18 at the respective sensor location 28. Since the magnetic field 18 at the respective sensor locations 28 is dampened depending on the distance from the transmission coil 20, the extent of the magnetic field 18 at the sensor location 28 and, therefore, also the level of the corresponding magnetic field measurement signal 32 are dependent on the distance of the sensor location 28 from the transmission coil 20. If the magnetic field measurement signal 32 is therefore present at three different magnetic field probes 30 at least, the relative position 34 of the vehicle 2 with respect to the transmission coil 20 and, thus, the relative position 34 of the receiving coil 16 with respect to the transmission coil 20 can be determined.

This relative position 34 can then, if possible, be reduced to zero and the receiving coil 16 therefore positioned exactly over the transmission coil 20, by means of suitable control actions being taken on the vehicle such as, for example, driving and steering.

In addition, there are provided on the vehicle 2 distance measuring sensors 36 which output, e.g. by means of radar beams 38, distance measurement signals 40 that are dependent on the distance from obstacles such as, for example, the two other vehicles 8, 10 and that are indicated in FIG. 4. Alternatively, distance measuring sensors 36 which detect the distance by means of ultrasound are also conceivable. On the basis of the distance measurement signals 40 a collision with the obstacles 8, 10 can then be prevented, for example by means of braking interventions on the vehicle 2. For the sake of clarity, not all of the distance measuring sensors 36 are provided with a reference numeral in FIG. 1.

The magnetic field probes 30 have to be installed in the vehicle at the individual sensor locations 28 and take up installation space accordingly. In order to reduce the required amount of installation space, the magnetic field probes 30 should be integrated if at all possible into already existing sensors on the vehicle 2.

Figure 2:
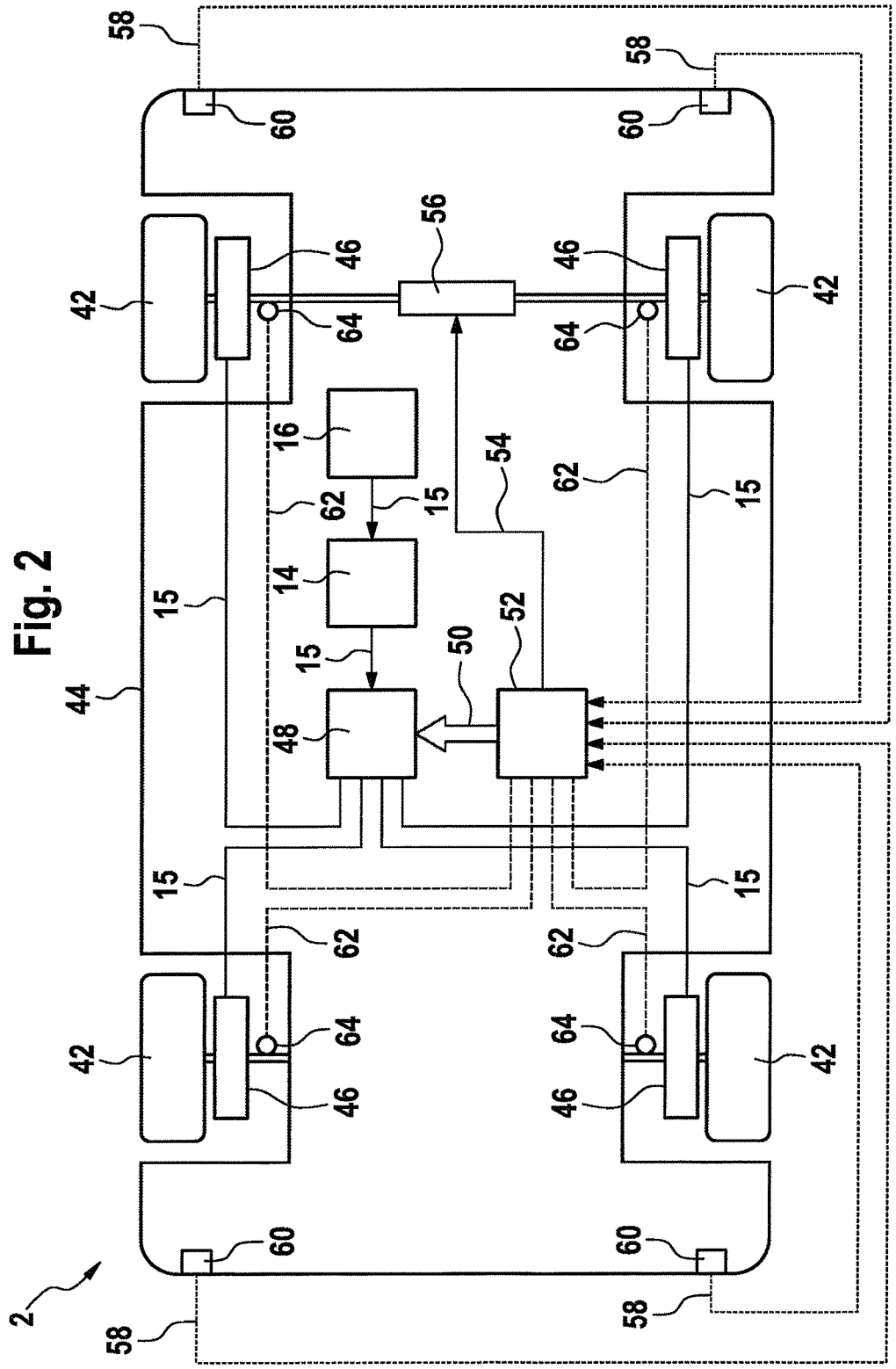
FIG. 2 shows a schematic diagram of the vehicle from FIG. 1.

In order to explain this, the construction of the vehicle 2 will first of all be explained in greater detail with reference to FIG. 2.

The vehicle 2 has a chassis 44 which is supported on four wheels 42, wherein each wheel 42 can be individually driven by means of an electric motor 46. An engine control system 48 is provided to drive the vehicle, which can supply the electric motors 46 with the electric energy 15 from the electric energy storage device 14 in order to propel the vehicle 2 on the basis of an acceleration request.

In this case, each electric motor 46 can be individually supplied with electric energy 15 in order, for example, to regulate the driving dynamics of the vehicle 2 having known driving dynamics per se.

The acceleration request 50 can come from various units in the vehicle 2 such as, for example, an accelerator pedal which is not illustrated in more detail. Within the framework of the present design, a parking assistant 52 outputs the acceleration request 50 in order to automatically park the vehicle 2 in the parking space 6. In addition to the acceleration request 50, the parking assistant 52 additionally outputs a steering angle 54, in order to thus control a steering 56 of the vehicle 2. In addition, the parking assistant 52 can additionally intervene in a brake of the vehicle 2, which is not shown in greater detail, by providing brake control signals.

The parking assistant 52 is essentially one or multiple controllers which can output the acceleration request 50, the steering angle 54 and the previously indicated brake control signals as control inputs on the basis of a comparison of nominal/actual values, as described, for example, in DE 198 09 416 A1 which is incorporated by reference.

Sensor signals are required for this. The sensor signals can, for example, be distance sensor signals 58 from distance sensors 60 that generate the distance sensor signals 58 as a function of the distance measurement signals 40 from the distance measuring sensors 36. In addition, the sensor signals can also be wheel speed signals 62 from wheel speed sensors 64. As is shown in FIG. 2, it is advantageous to arrange the magnetic probe 30 at the corner areas of the vehicle 2. Both the determined distance sensors 60 and the wheel speed sensors 64 are suitable in a particularly advantageous way as sensors for the magnetic probe 30.

The magnetic field probes 30 can be installed both in the distance sensors 60 and in the wheel speed sensors 64. The advantage in both cases is that the resulting overall sensor can always be installed in the same way, because these types of sensors detect the same measurement variable at different sensor locations 28 in the vehicle 2.

According to FIG. 3 the magnetic field probes 30 can be installed in the wheel speed sensors 64, which is not preferred for the reasons explained below.

Each wheel speed sensor 64 detects the speed of a wheel 42 on the basis of an encoder wheel 66 rotating at the speed of the wheel 42, which encoder wheel is encoded in the circumferential direction of the rotation with magnetic north poles 68 and magnetic south poles 70 and thus excites a corresponding magnetic sensor field 72.

To this end, each wheel speed sensor 64 comprises a housing 73 in which a speed measuring sensor 74 which is sensitive to a magnetic field is housed, which detects the sensor field 72 and, on the basis thereof, outputs a speed sensor signal 76 dependent on the speed. The speed sensor signal 76 is evaluated in a signal processing circuit 34, wherein the wheel speed signal 62 is generated and is output to an interface 80. A shielding plate 82 in the housing 73 shields the electronic components of the wheel speed sensor 64 from external electromagnetic influences.

The magnetic field probe 30 can be connected directly to the interface 80 or indirectly via the signal processing circuit 78, wherein the interface 80 from the wheel speed signal 62 and the magnetic field measurement signal 32 generates a joint data transmission signal 84 and transfers this via a two-wire line 86 to the parking assistant 52.

However, the shielding plate 82 in this embodiment example not only shields against electromagnetic influences, but also the magnetic field 18. Therefore, the use of the magnetic field probes 30 in the speed sensors 64 is not preferred, as already indicated.

The design principle of the distance sensors 60 shown in FIG. 4 is such that they do not have a shielding plate 82, which is why it is not possible to shield the magnetic field here either. Therefore, the magnetic field probes 30 should be installed in the distance sensors 60 using the principle explained in FIG. 3.

It is particularly advantageous to install the magnetic probes 30 in distance sensors. On the one hand, this removes the necessity for a separate sensor to sense the position of the charging station 22. In this way, it is possible to make savings on installation space, additional electrical wiring and installation costs. In addition, a particularly major advantage of distance sensors is the fact that they are installed in the bumpers of the vehicle, which usually consist of plastic and therefore do not adversely affect the effectiveness of the magnetic probe 30. However, it is just as conceivable that the magnetic probes 30 are incorporated or integrated into pressure sensors. Such pressure sensors are also located in the bumpers of a vehicle and are used to sense contact of the bumper with a person. The magnetic probes are expediently integrated into such pressure sensors. However, it is also conceivable for the magnetic probes 30 to be embedded separately in a foam, in which the pressure sensor is also embedded. Such a pressure sensor[i] has been developed and sold by the applicant.

[i]http://www.continental-corporation.com/www/presseportal_com_de/themen/pressemitteilungen/3_automotive_group/chassis_safety/press_releases/
pr_2010_10_05_fussagaengerschuts_sensoren_de.html In general, there should not be any metal in the surroundings of the magnetic field probes 30 so as not to disrupt the propagation of the magnetic field 18 in the area of the magnetic field probes 30.

The invention claimed is:

1. A sensor arrangement comprising multiple distance sensors arranged in a vehicle at locations at a distance from each other and which are configured to output a first measurement signal that is dependent on a distance from an obstacle which is located at a distance from the vehicle, each distance sensor comprising:
   a housing;
   a sensor circuit inside the housing having a distance measuring sensor for generating a first distance measurement signal on the basis of the distance;
   a magnetic field probe inside the housing for generating a second measurement signal that is dependent on a magnetic field to be detected;
   a signal processing circuit for processing the second measurement signal generated by the magnetic field probe; and
   an interface inside the housing electrically and separately coupled to the sensor circuit, the signal processing circuit and a wire, the interface generating a joint data transmission signal from the first distance measurement signal and the second measurement signal processed by the signal processing circuit, and outputting the joint data transmission signal to a vehicle controller via the wire.

2. The sensor arrangement according to claim 1, further comprising a housing in which the sensor circuit and the magnetic field probe are jointly housed.

3. The sensor arrangement according to claim 2, wherein the housing of the distance sensor consists essentially of non-magnetic materials.

4. A method for positioning a vehicle, in which a sensor arrangement according to claim 1 is arranged, the sensor arrangement comprising at least two sensors positioned at sensor locations which are located at a distance from one another, over a transmission coil in order to induce a charging voltage in a receiving coil of the vehicle in order to charge an electric energy storage device with a magnetic field, comprising:
   detecting an extent of the magnetic field for each sensor location with the respective sensor arranged at the sensor location,
   determining a relative position of the transmission coil with respect to the vehicle on the basis of the detected extents of the magnetic field at the sensor locations, and
   moving the vehicle on the basis of the determined relative position until the vehicle is positioned with the transmission coil over the receiving coil.

5. The method according to claim 4, wherein the relative position of the transmission coil with respect to the vehicle is determined on the basis of a triangulation of the detected extents of the magnetic field at the sensor locations.

6. The method according to claim 4, wherein in order to move the vehicle over the transmission coil, the vehicle is moved on a path determined on the basis of the relative position, and wherein the vehicle is monitored during the movement on this path with the first measurement signal from the sensor circuit with respect to a collision with obstacles in the surroundings.

7. The method according to claim 4, further comprising:
   positioning of the vehicle in an area around the transmission coil on the basis of a global navigation satellite system (GNSS), until the magnetic field can be detected with the sensors.

8. A control device which is set up to carry out a method according to claim 4.

9. A vehicle, comprising:
   a chassis supported on wheels,
   at least three sensors arranged at sensor locations located at a distance from one another, the sensors configured to output a first measurement signal dependent on a distance from an obstacle located at a distance from the vehicle, each sensor comprising:
      i) a housing,
      ii) a sensor circuit inside the housing having a distance measuring sensor for generating a first distance measurement signal on the basis of the distance,
      iii) a magnetic field probe in the housing for generating a second measurement signal that is dependent on a magnetic field to be detected, the sensor arrangement positioned over a transmission coil in order to induce a charging voltage in a receiving coil of the vehicle in order to charge an electric energy storage device with a magnetic field,
      iv) a signal processing circuit for processing the second measurement signal generated by the magnetic field probe, and
      v) an interface inside the housing electrically and separately coupled to the sensor circuit, the signal processing circuit and a wire, the interface generating a joint data transmission signal from the first distance measurement signal and the second measurement signal processed by the signal processing circuit, and outputting the joint data transmission signal via the wire, and
   a control device which is set up to carry out a method for positioning the vehicle, comprising:
      receiving the joint data transmission signal,
      detecting an extent of the magnetic field for each sensor location from the joint data transmission signal,
      determining a relative position of the transmission coil with respect to the vehicle on the basis of the detected extents of the magnetic field at the sensor locations, and
      moving the vehicle on the basis of the determined relative position until the vehicle is positioned with the transmission coil over the receiving coil.

10. The vehicle according to claim 9, wherein the sensors are arranged at corner areas of the vehicle.

11. The sensor arrangement according to claim 2, wherein the housing of the distance sensor consists essentially of a plastic or multiple plastics.

12. The method according to claim 5, wherein in order to move the vehicle over the transmission coil, the vehicle is moved on a path determined on the basis of the relative position, and wherein the vehicle is monitored during the movement on this path with the first measurement signal from the sensor circuit with respect to a collision with obstacles in the surroundings.

13. The method according to claim 6, further comprising:
   positioning of the vehicle in an area around the transmission coil on the basis of a global navigation satellite system (GNSS), until the magnetic field can be detected with the sensors.

14. The vehicle according to claim 9, wherein the sensors are arranged at corner areas of a bumper of the vehicle.

\* \* \* \* \*